Patented May 29, 1923.

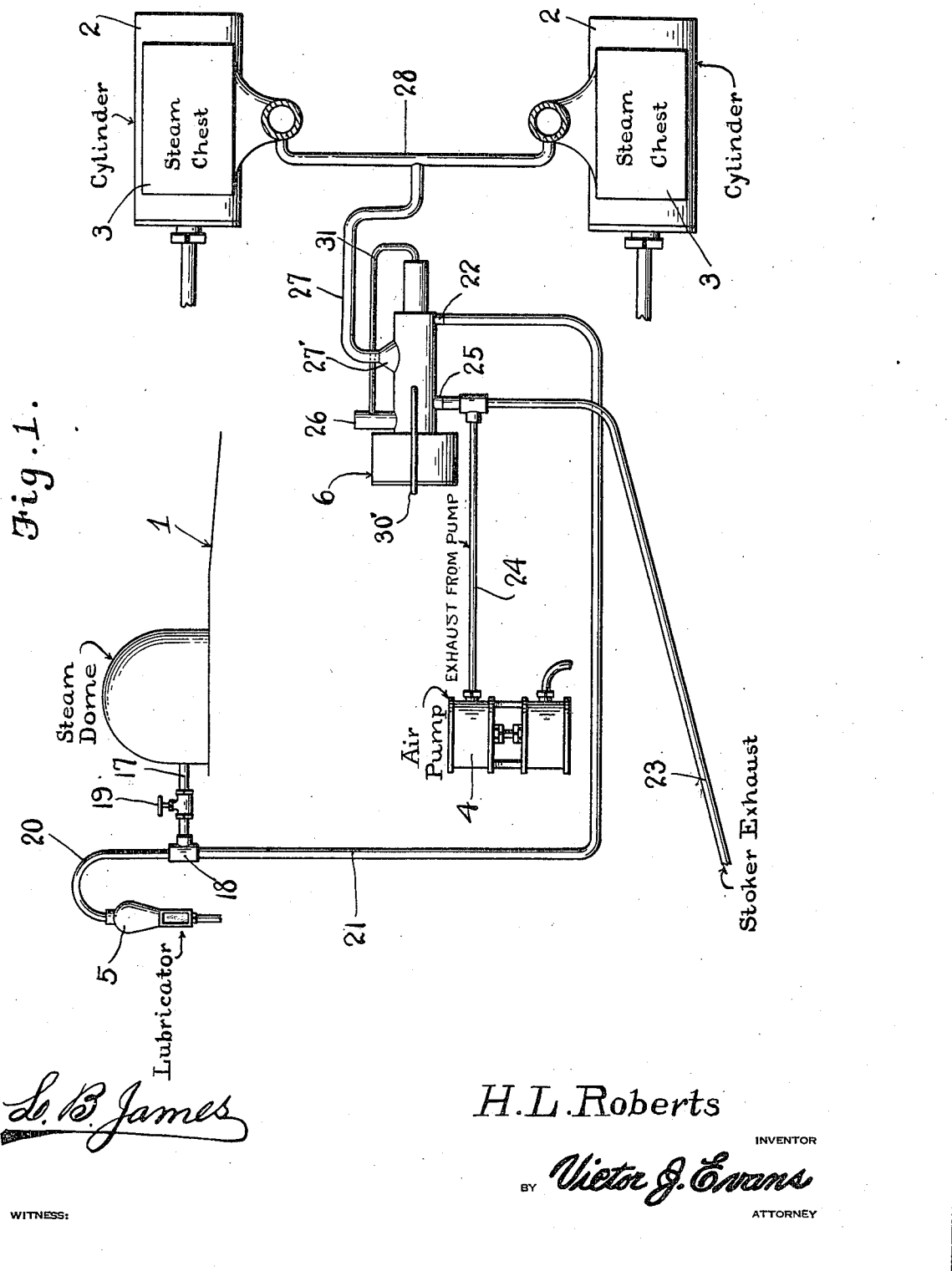

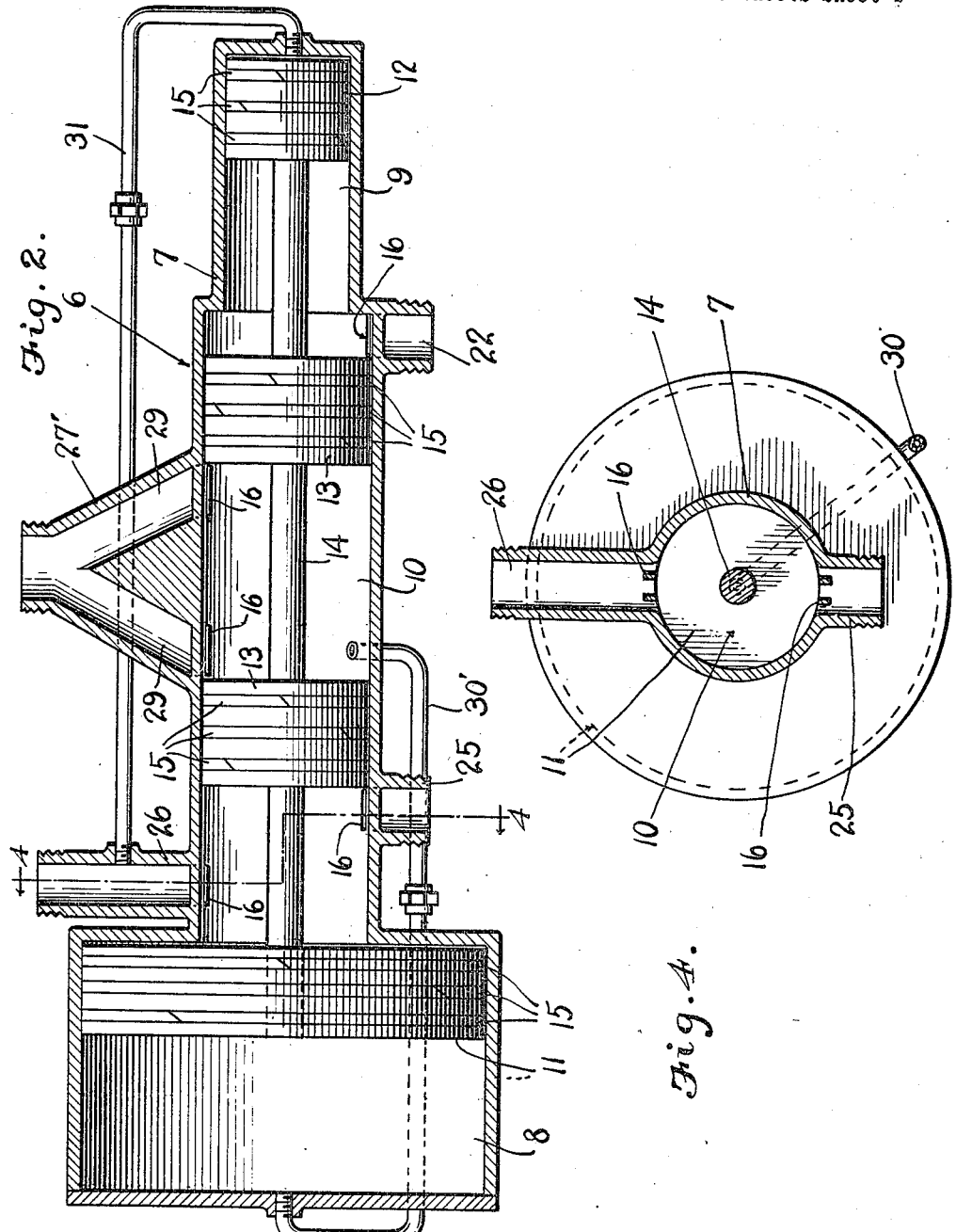

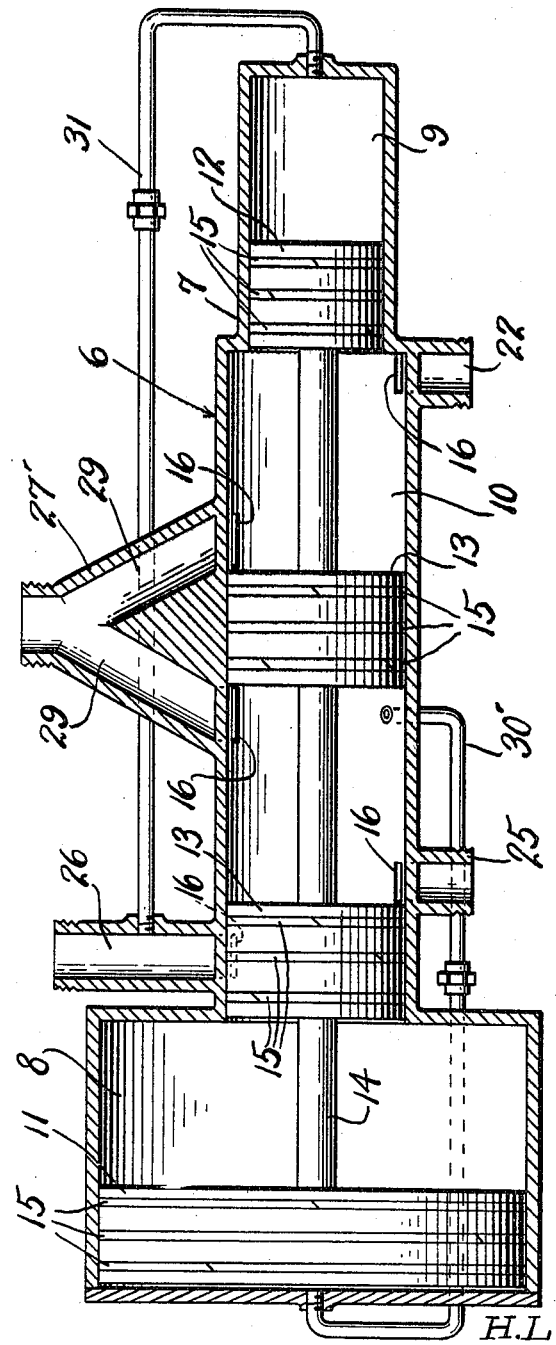

1,457,272

UNITED STATES PATENT OFFICE.

HUGH LEONARD ROBERTS, OF ROANOKE, VIRGINIA.

DRIFTING VALVE.

Application filed July 31, 1920. Serial No. 400,311.

*To all whom it may concern:*

Be it known that I, HUGH L. ROBERTS, a citizen of the United States, residing at Roanoke, in the county of Roanoke and State of Virginia, have invented new and useful Improvements in Drifting Valves, of which the following is a specification.

This invention relates to improvements in drifting valves for locomotives, one of the objects of the invention being to provide an automatic valve which is so arranged in the system that it will be placed in active condition as soon as the engineer turns the steam on to the lubricating system.

Another object of the invention is to provide means whereby the oil laden steam from the exhaust of the air pump and stoker will pass through the drift valve and through the engine cylinders when the engine is drifting so that the valve and cylinders will be lubricated.

Still another object of the invention is to provide means whereby the valve will act to permit steam to flow into the cylinder, when the throttle is closed and the engine is drifting, to prevent explosions of the oil in the hot cylinders, and means whereby an excess pressure in the cylinders will act to move the drift valve to running position and thus prevent the excess pressure from backing up in the air pump and stoker connections.

A further object of the invention is to provide means for cushioning the pistons of the drift valve by the oil laden steam from the air pump and stoker exhaust, this oil laden steam also acting to lubricate the pistons.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a diagrammatic view showing the application of the invention.

Figure 2 is a longitudinal sectional view of the drift valve.

Figure 3 is a similar view with the valve in its opposite position.

Figure 4 is a section on line 4—4 of Figure 2.

Referring to Figure 1, 1 indicates the steam dome of the locomotive boiler, 2 the cylinders of the locomotive, 3 the steam chest, 4 the air pump, 5 the lubricator and 6 my improved drift valve.

As shown in the drawings the drift valve comprises a casing 7 which is so formed as to provide a large chamber 8 at one end, a small chamber 9 at the other end and a medium chamber 10 between the chambers 8 and 9. A large piston 11 is located in the chamber 8, a small piston 12 is located in the chamber 9 and a pair of pistons 13 are located in the chamber 10. These four pistons are located on the stem 14 so that they move in unison. The pistons are provided with the usual rings 15 and all the ports are provided with the grate bars 16 for preventing the rings from expanding into the ports as they pass over the same.

A pipe 17 leads from the steam dome to a coupling 18, said pipe 17 being supplied with a valve 19. A pipe 20 leads from the coupling 18 to the lubricator and a pipe 21 leads from the coupling 18 to the nipple 22 on the drift valve. I prefer to use a two-inch pipe at 17, a half-inch pipe at 20 and a one-inch pipe at 21 so that the supply of steam to the pipes 20 and 21 will be ample. As will be seen from Figure 2 the pipe 21 will deliver the steam between the pistons 12 and 13 adjacent the small end of the drift valve.

A pipe 23 is connected with the exhaust of the stoker and a pipe 24 is connected with the exhaust of the air pump 4 and these pipes are connected by the nipple 25 with the space between the pistons 11 and 13 so that the oil laden steam from the air pump and stoker is delivered to the drift valve. When the throttle is open and the engine is running this steam will pass from the drift valve through the outlet 26 which is out of alignment with the nipple 25 as shown in Figure 2.

The chamber 10 is connected with the steam chest of the cylinder by the pipes 27 and 28. The pipe 27 is provided with an enlargement 27' at the point where it connects with the drift valve casing and said casing is provided with a pair of ports 29, which are enclosed by said enlargements. These ports are separated by wedge shaped members 30 which also divide the interior of the enlargement into two inclined passages, each of which communicates with a port.

A small pipe 30 leads from chamber 10 to the outer end of chamber 8 and a pipe 31 leads from exhaust 26 to the outer end of chamber 9.

It will thus be seen that when the engineer, at the beginning of his run, turns on the steam to the lubricator he will at the same time turn on the steam to the drift valve. This steam will flow into the space between the pistons 12 and 13 and as piston 13 is larger than piston 12 the steam would naturally force the pistons to the left in Figure 2 but this movement is prevented as the steam in the cylinders will back up into the space between the pistons 13 and will flow through pipe 30 into chamber 8 and the pressure of this steam in said chamber 8 acting upon the large piston 11 will hold the pistons in the position shown in Figure 2. In this position of the parts the oil laden steam from the stoker and air pump will pass into the space between the pistons 13 and 11 and will pass from this space through the exhaust 26.

As soon as the throttle is closed the pressure in the space between the cylinders 13 and that in chamber 8 will be removed so that the steam flowing through pipe 21 into the space between pistons 12 and 13 will move the pistons towards the left, as shown in Figure 3. This will divert the exhaust from the stoker and air pump, flow into the casing through nipple 25, into the space between the pistons 13, so that this oil laden steam will pass into the cylinders and thus lubricate the same. The steam flowing through nipple 22 will pass through the port and passage at the right of Figure 2, the port 29 being uncovered by piston 13, and this steam will flow into the cylinders, thus preventing the entrance of air thereto and preventing explosions of the oil in the hot cylinders. The construction of the passages in the enlargement 27' will cause the steam flowing from one passage into pipe 27 to create a suction in the other passage and thus draw the oil laden steam from the exhaust of the air pump and stoker into the pipe 27 so that it will mingle with the steam from the boiler and will pass with said steam into the cylinders. The oil laden steam passing through the pipe 30 into the outer end of chamber 8 will act to cushion the piston 11 in its outward movement and at the same time lubricate the same. The oil laden steam passing from the exhaust into pipe 31 into the outer end of chamber 9 will also act to cushion piston 12 and to lubricate the same.

If the pressure of steam in the cylinders should become excessive while the throttle is closed and the parts are in the position shown in Figure 3, this pressure would act upon the large piston 11 and thus force the pistons to the right so as to cut off the supply of boiler steam to the cylinders and permitting the exhaust from the pump and stoker to pass through the exhaust 26. When the pressure in the cylinder is reduced again the parts will return to their position shown in Figure 3.

It will be seen that the engineer cannot fail to place the drift valve in active position as he will do this when he turns the steam on to the lubricator at the beginning of his run. The oil laden steam from the exhaust of the pump and stoker will thoroughly lubricate both the drift valve and the cylinders and the pistons therein and as soon as the throttle is closed the valve will automatically supply live steam and the oil laden steam to the cylinders so as to lubricate the same and prevent explosions of the oil therein. If the pressure should become excessive in the cylinders the drift valve will automatically cut off the steam thereto and will again supply steam to the cylinders when the pressure drops to normal. Slamming of the movable parts of the drift valve is also prevented by the cushioning steam supplied by the pipes 30 and 31.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a locomotive, a drifting valve connected with the cylinders thereof and with the exhaust of the air pump and stoker, said valve comprising a casing forming a medium sized central chamber, a small chamber at one end and a large chamber at the other end, a pair of pistons in the central chamber and a piston in each of the small and large chambers, a stem connecting the pistons together, the inlet port for the exhaust steam of the stoker and air pump being controlled by the first middle piston and the connection leading to the cylinders communicating with the central part of the central chamber, said connection being formed with two branches, one branch being controlled by the second middle piston, a pipe for delivering steam from the steam dome to the space between the small piston and one of the middle pistons, a pipe leading from the middle chamber to the outer end of the large chamber for leading steam from the cylinders and backing up into the middle chamber to the large chamber, and an exhaust connected with the space between the large piston and one of the middle pistons.

2. A drifting valve for locomotives comprising a casing formed with a medium sized central chamber, a small chamber at one end and a large chamber at the other end, a pair of pistons in the central chamber and a piston in each of the small and large chambers, a stem connecting the pistons together, an exhaust port connected with the space between the large piston and one of the middle pistons, an inlet port connected with the exhaust of the air pump and stoker and adapted to be controlled by said middle piston, a second inlet port connected with the steam dome and located between the small piston and the other middle piston, a connection between the middle chamber and the cylinders of the locomotive, said connection having a forked end where it joins the drift valve, said forks communicating with the space between the two middle pistons and one fork being controlled by one of the pistons, a pipe connecting the space between the two middle pistons to the outer end of the large chamber and a pipe connecting the exhaust for the steam from the air pump and stoker with the outer end of the small chamber.

3. A drifting valve for locomotives comprising a casing formed with a medium sized central chamber, a small chamber at one end and a large chamber at the other end, said central chamber having a pair of spaced ports therein, a wedge member between the ports, a pipe having an enlargement closing said ports and wedge member, said wedge member dividing the enlargement into a pair of passages, means for connecting the pipe with the cylinders of the locomotive, means for connecting one end of the central chamber with the boiler, means for connecting the other end of the chamber with the exhaust of the air pump and stoker, an exhaust nipple offset from the connection to the pump and stoker, a pair of pistons in said central chamber, one of which in one position will permit the steam from the inlet to flow through one passage and in the other position will cut off the steam from this passage and the other piston in one position directing the steam from the pump and stoker to the outlet nipple and in the other position directing it to the other passage, a large piston in the large chamber, a small piston in the small chamber, a stem connecting all the pistons together, a pipe leading from the space between the two pistons in the middle chamber to the outer end of the large chamber for permitting the steam backing up in said middle chamber from the cylinders to act against the said large piston and a pipe leading from the exhaust nipple to the outer end of the small chamber.

In testimony whereof I affix my signature.

HUGH LEONARD ROBERTS.